United States Patent
Jun et al.

(10) Patent No.: US 11,403,014 B2
(45) Date of Patent: *Aug. 2, 2022

(54) MANAGING PRIVILEGES OF DIFFERENT ENTITIES FOR AN INTEGRATED CIRCUIT

(71) Applicant: Cryptography Research, Inc., San Jose, CA (US)

(72) Inventors: Benjamin Che-Ming Jun, Burlingame, CA (US); William Craig Rawlings, Saratoga, CA (US); Ambuj Kumar, Sunnyvale, CA (US); Mark Evan Marson, Lafayette, CA (US)

(73) Assignee: Cryptography Research, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,864

(22) Filed: Dec. 4, 2020

(65) Prior Publication Data
US 2021/0173576 A1 Jun. 10, 2021

Related U.S. Application Data

(63) Continuation of application No. 15/512,041, filed as application No. PCT/US2015/047801 on Aug. 31, 2015, now Pat. No. 10,860,229.
(Continued)

(51) Int. Cl.
*G06F 3/06* (2006.01)
*G06F 21/71* (2013.01)
(Continued)

(52) U.S. Cl.
CPC .......... *G06F 3/0637* (2013.01); *G06F 3/0622* (2013.01); *G06F 3/0688* (2013.01);
(Continued)

(58) Field of Classification Search
CPC .... G06F 3/0637; G06F 3/0622; G06F 3/0688; G06F 21/71; G06F 21/76; G11C 17/16; G11C 17/18
See application file for complete search history.

(56) References Cited

U.S. PATENT DOCUMENTS

| 7,549,045 B2 | 6/2009 | Massarenti et al. |
| 8,387,117 B2 * | 2/2013 | Eom ................... G06F 21/6218 726/4 |

(Continued)

FOREIGN PATENT DOCUMENTS

EP 0 715 243 A1 6/1993

OTHER PUBLICATIONS

ISR—Notification of Transmittal of the International Search Report and the Written Opinion of the International Searching Authority, or the Declaration dated Nov. 12, 2015 re Intl. Appln. No. PCT/US2015/047801. 14 Pages.

*Primary Examiner* — Prasith Thammavong
(74) *Attorney, Agent, or Firm* — Lowenstein Sandler LLP

(57) ABSTRACT

A request associated with one or more privileges assigned to a first entity may be received. Each of the one or more privileges may correspond to an operation of an integrated circuit. Information corresponding to the first entity and stored in a memory that is associated with the integrated circuit may be identified. Furthermore, the memory may be programmed to modify the information stored in the memory that is associated with the integrated circuit in response to the request associated with the one or more privileges assigned to the first entity.

20 Claims, 12 Drawing Sheets

Related U.S. Application Data

(60) Provisional application No. 62/051,496, filed on Sep. 17, 2014.

(51) Int. Cl.
*G06F 21/76* (2013.01)
*G11C 17/16* (2006.01)
*G11C 17/18* (2006.01)

(52) U.S. Cl.
CPC .............. *G06F 21/71* (2013.01); *G06F 21/76* (2013.01); *G11C 17/16* (2013.01); *G11C 17/18* (2013.01)

(56) References Cited

U.S. PATENT DOCUMENTS

| | | | |
|---|---|---|---|
| 2004/0221036 A1* | 11/2004 | Smith | G06F 9/468 709/225 |
| 2007/0143860 A1 | 6/2007 | Hardt | |
| 2007/0150937 A1 | 6/2007 | Gatto et al. | |
| 2012/0110636 A1 | 5/2012 | Van Biljon et al. | |
| 2012/0246718 A1* | 9/2012 | Spears | G06F 16/285 726/21 |
| 2013/0125210 A1* | 5/2013 | Felt | G06F 21/6218 726/4 |
| 2014/0044265 A1* | 2/2014 | Kocher | H04L 63/0823 380/277 |
| 2014/0101320 A1* | 4/2014 | Endo | H04L 47/78 709/226 |
| 2014/0359755 A1* | 12/2014 | Beitel | G06F 21/572 726/18 |
| 2017/0091236 A1 | 3/2017 | Hayes et al. | |
| 2017/0366974 A1* | 12/2017 | Patil | H04W 12/37 |
| 2018/0357183 A1 | 12/2018 | Kumar et al. | |

* cited by examiner

MANAGING PRIVILEGES OF DIFFERENT ENTITIES FOR AN INTEGRATED CIRCUIT

RELATED APPLICATIONS

This application is a continuation of U.S. patent application Ser. No. 15/512,041, filed Mar. 16, 2017, which is a continuation of a National Stage application of International Application No. PCT/US2015/047801, filed Aug. 31, 2015, which claims the benefit of U.S. Provisional Application No. 62/051,496, filed Sep. 17, 2014, the entire contents of all are herein incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
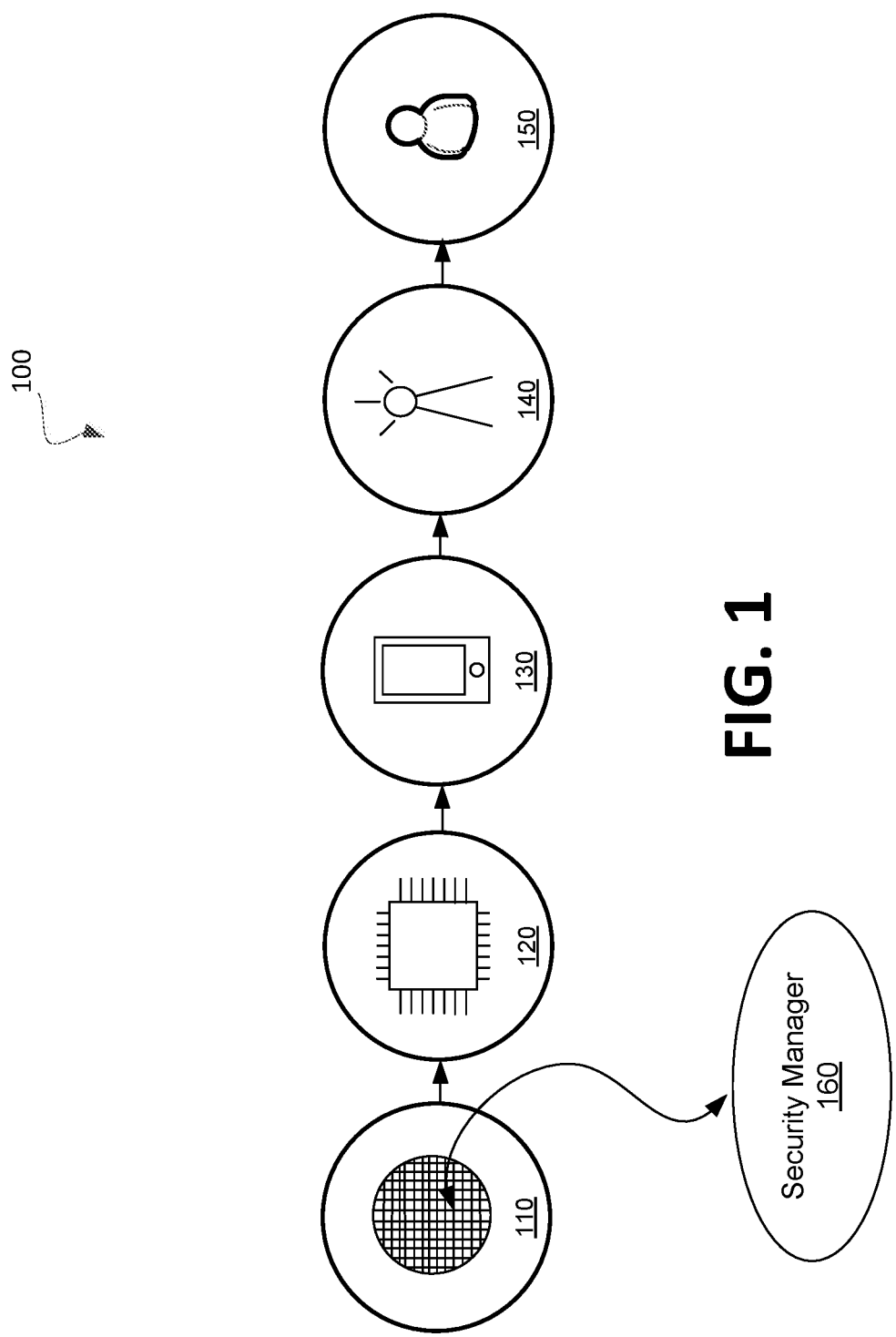
FIG. 1 illustrates an example lifecycle of an integrated circuit including a security manager in accordance with some embodiments.

Aspects of the present disclosure are directed to managing privileges of different entities for an integrated circuit. An integrated circuit may include a security manager to manage privileges of the integrated circuit that are assigned or are to be assigned to different entities that may be in possession of the integrated circuit at various times. Privileges may correspond to access to a functionality of the integrated circuit or the performance of an operation by the integrated circuit. For example, a privilege that has been assigned to an entity may specify whether the entity may access a particular functionality of the integrated circuit or perform a particular operation by the integrated circuit. Examples of the functionality or operations associated with an integrated circuit include, but are not limited to, access of certain hardware capabilities of the integrated circuit, access to debug or diagnostic states of the integrated circuit, and the writing to a memory associated with the integrated circuit.

Different entities may possess or utilize the integrated circuit at different times throughout the lifecycle of the integrated circuit. For example, a first entity may be a manufacturing entity that manufactures the integrated circuit. A second entity (e.g., a chip packaging provider) may receive the integrated circuit from the first entity and use the integrated circuit in a chip package. A third entity (e.g., a device manufacturer) may receive the chip package from the second entity and incorporate the chip package that includes the integrated circuit into a device. Accordingly, multiple entities may utilize and possess the integrated circuit at various stages. Each of the entities may be able to access at least some functionality or operations of the integrated circuit.

The entities may be assigned privileges that determine whether the entity may be able to access particular functionality or operations of the integrated circuit and whether the entity may not be able to access other functionality or operations of the integrated circuit. Privileges may refer to whether or not an entity has permission to access a functionality or operation of the integrated circuit. A security manager of the integrated circuit may be used to manage the assigning of such privileges to entities.

A particular entity may be a root authority or root entity (e.g., an entity that is associated with an authority to manage or configure a security manager component of the integrated circuit). For example, the first entity that manufactures the integrated circuit may be a root entity and may assign privileges to one or more other entities that may be referred to as delegate entities. Accordingly, the root entity may program or configure the security manager of the integrated circuit at a time when the integrated circuit is manufactured. Additionally, the root entity may further configure the security manager at a later time to assign privileges to one or more delegate entities. For example, the root entity may assign itself privileges to access all functionality or operations of the integrated circuit and may assign a subset of the functionality or operations of the integrated circuit to a delegate entity. In some embodiments, the root authority or root entity may be the first entity that designs the integrated circuit, and the delegate entity is the entity that manufactures the integrated circuit.

In some embodiments, the security manager may be associated with a memory to store information corresponding to privileges assigned to the root entity as well as the delegate entities. The memory may be, but is not limited to, a one-time programmable (OTP) memory that is associated with the integrated circuit. The memory may be programmed at manufacturing (e.g., by the root entity) and may further be programmed after manufacturing (e.g., by the root entity or a delegate entity). Accordingly, privileges may be assigned to the root entity or a delegate entity by programming of a memory associated with the integrated circuit. In some embodiments, the security manager may control the programming of the memory.

As previously described, the integrated circuit may be associated with various stages that involve different entities possessing or utilizing the integrated circuit. Thus, the root entity may first manufacture the integrated circuit, a second entity may receive the integrated circuit from the root entity, and a third entity may include the integrated circuit from the second entity into a particular device or product. The root entity may still be assigned privileges to the functionality or operations of the integrated circuit while the integrated circuit is in possession of the third entity. In such a scenario, the root entity may access such functionality or operations of the integrated circuit despite no longer being responsible for the integrated circuit.

In some embodiments, the security manager may be configured to assign privileges to one or more delegate entities while also being configured to revoke privileges that were assigned to the root entity. For example, the security manager may program the memory associated with the integrated circuit to assign privileges to a delegate entity as well as to revoke privileges associated with the root entity in response to a request from the root entity.

FIG. 1 illustrates an example lifecycle 100 of an integrated circuit including a security manager. In general, the lifecycle 100 illustrates the handling of an integrated circuit that includes a security manager 160 through various stages of the lifecycle 100 involving different entities. In some embodiments, the security manager 160 of the integrated circuit may manage privileges associated with the entities.

As shown in FIG. 1, the lifecycle 100 may involve various entities utilizing the integrated circuit at various times. For example, a first entity 110 may be a manufacturing entity that manufactures or fabricates the integrated circuit that includes a security manager 160. In some embodiments, the security manager 160 may include a memory (e.g., an OTP memory) or the integrated circuit may include a memory that is managed or partially managed by the security manager 160. The first entity 110 may configure the security manager to program the memory to include privileges for the first entity 110 to access functionality or operations associated with the integrated circuit. Such privileges may be programmed into the memory during the manufacturing of the integrated circuit. The first entity 110 may also be referred to as a root entity and be assigned root authority privileges for the integrated circuit. In some embodiments, the root authority privileges may allow access to all of the functionality or operations associated with the integrated circuit and allow for the assigning of privileges for some or all of the functionality or operations to delegate entities. The lifecycle 100 may include a second entity 120. For example, the second entity 120 may be a semiconductor chip packaging provider that receives the integrated circuit from the first entity 110 and produces a semiconductor package for the integrated circuit that includes the security manager 160. The first entity 110 may configure the security manager 160 to program the memory associated with the integrated circuit to assign privileges to the second entity 120. For example, privileges associated with a subset of the operations or functionality assigned to the root entity (e.g., the first entity 110) may also be assigned to the second entity 120. Accordingly, the memory of the integrated circuit may be programmed by the security manager to assign privileges to the second entity 120 after the security manager has previously assigned privileges to the first entity 110.

Referring to FIG. 1, a third entity 130 may receive the semiconductor package that includes the integrated circuit from the second entity. For example, the third entity 130 may be a device manufacturer that includes or incorporates the integrated circuit into an electronics device. The third entity may also be assigned privileges associated with the functionality or operations of the integrated circuit. For example, the first entity 110 or the second entity 120 may assign certain privileges to the third entity 130. Additionally, a fourth entity 140 may interact with the electronics device that includes the integrated circuit. For example, the integrated circuit may be a communications circuit that is incorporated into a cellular phone or other such mobile device and the fourth entity 140 may be a type of service provider for communications services used by the cellular phone. Furthermore, a fifth entity 150 may be an end user that is in final possession of the electronics device that includes or incorporates the integrated circuit that includes the security manager 160. The fourth entity 140 and the fifth entity 150 may further be assigned privileges by the configuring of the security manager 160 to program a memory of the integrated circuit.

Accordingly, the memory of the integrated circuit may store privileges associated with each of the first entity 110, second entity 120, third entity 130, fourth entity 140, and fifth entity 150. However, at each stage of the lifecycle 100, the privileges assigned to various entities may no longer be necessary or desired. For example, the third entity 130 that manufactures an electronics device may not wish that the first entity 110 that manufactures or fabricates the integrated circuit or the second entity 120 that creates a semiconductor package that includes the integrated circuit to have any active privileges for the functionality or operations of the integrated circuit. As such, the security manager 160 may be configured to revoke the privileges assigned to the first entity (e.g., the root entity) and the second entity (e.g., a delegate entity) while retaining the privileges for the third entity (e.g., another delegate entity). For example, the memory may be programmed to effectively remove or eliminate the privileges that were previously assigned to the first entity 110 and the second entity 120. Thus, the memory associated with the integrated circuit may be used to store privileges associated with each entity as well as to revoke privileges associated with each of the entities as the integrated circuit progresses through the lifecycle 100.

Figure 2:
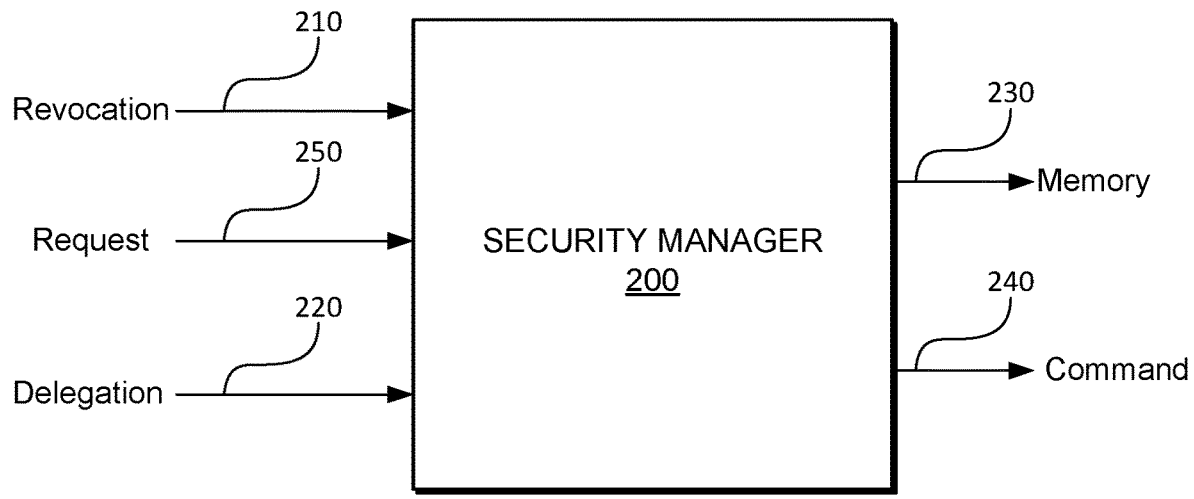
FIG. 2 is a block diagram of an example security manager in accordance with some embodiments of the present disclosure.

FIG. 2 is a block diagram of an example security manager 200. In general, the security manager 200 may correspond to the security manager 160 of FIG. 1. In some embodiments, the security manager 200 may incorporate a memory or be associated with a memory of an integrated circuit. The security manager 200 may be implemented by an integrated circuit or a portion of an integrated circuit.

As shown in FIG. 2, the security manager 200 may receive a revocation signal 210 and a delegation signal 220. In some embodiments, the security manager 200 may assign privileges to a root entity or the integrated circuit that incorporates the security manager 200 may be manufactured to include such privileges (e.g., the memory is programmed at manufacture or a mask associated with the integrated circuit may be used). The revocation signal 210 may specify that the security manager 200 is to revoke privileges assigned to the root entity. In response to receiving the revocation signal 210, the security manager 200 may thus program a memory (e.g., an OTP memory) to eliminate or remove the privileges that were previously assigned to the root entity. The delegation signal 220 may assign privileges to one or more delegate entities. For example, the delegation signal 220 may receive information from the root entity to assign privileges associated with a subset of functionality or operations associated with the integrated circuit to a delegate entity. In some embodiments, the delegation signal 220 may be received from a delegate entity to assign privileges associated with a further subset of the functionality or operations associated with the integrated circuit to another delegate entity.

The security manager 200 may output a memory signal 230 and a command signal 240. In some embodiments, the memory signal 230 may program a memory of an integrated circuit that includes the security manager 200. For example, a portion of the memory or the entirety of the memory may be allocated to the security manager 200 such that only the security manager 200 may program or change the contents of the memory or the portions of the memory that have been allocated to the security manager 200. In some embodiments, the security manager 200 may output the memory signal 230 in response to receiving either the revocation signal 210 or the delegation signal 220. Additionally, the command signal 240 may output a command for the integrated circuit to allow access to a function or to perform an operation in response to a valid request received from the request signal 250. For example, an entity may request to access a functionality or operation of the integrated circuit. In response to receiving the request, the privileges assigned to the requesting entity may be verified. For example, the contents of the memory corresponding to privileges assigned to the requesting entity may be received and verified to determine if the requesting entity has privileges that correspond to the request. If the privileges of the requested entity are verified, then the command signal 240 may be output to perform the functionality or operation associated with the integrated circuit. However, if the privileges of the requested entity are not verified, then the command signal 240 will not indicate that the functionality or operations of the integrated circuit should be accessed.

Figure 3:
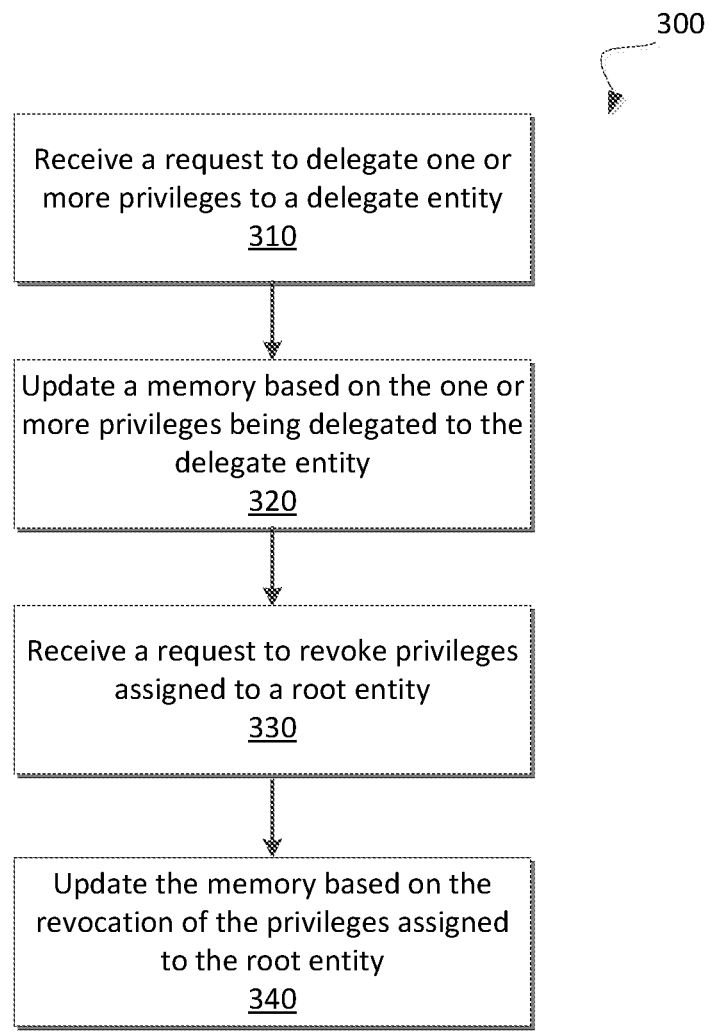
FIG. 3 is a flow diagram of an example method to update a memory to assign a privilege to a delegate entity and to revoke a privilege assigned to a root entity in accordance with some embodiments.

FIG. 3 is a flow diagram of an example method 300 to update or program a memory to assign a privilege to a delegate entity and to revoke a privilege assigned to a root entity. In general, the method 300 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 300 may be performed by the security manager 160 and/or the security manager 200 of FIGS. 1 and 2.

As shown in FIG. 3, the method 300 may begin with the processing logic receiving a request to delegate one or more privileges to a delegate entity (block 310). For example, the request may be received from a root entity seeking to assign one or more privileges for a subset of functionality or operations of an integrated circuit to the delegate entity. The root entity may be assigned privileges to a first, second, and third function or operation of the integrated circuit and may assign privileges to the delegate entity to access the first function or operation of the integrated circuit but not the second or third function or operation of the integrated circuit. Examples of function or operation associated with an integrated circuit include, but are not limited to, the ability to enable or disable certain hardware capabilities of the integrated circuit, adjust performance settings or other values of the integrated circuit, allow use of certain external interfaces, allow use of certain modes of operation, enable or disable test modes (e.g., control diagnostic and debug mode), control over when a particular mode or feature is active (e.g., only active during the manufacturing process), the ability to adjust the values of certain configuration settings of features of the integrated circuit, derive and/or use one or more key encrypting keys, encrypt keys for use by the integrated circuit, supply keys to components of the integrated circuit, adjust configuration of the integrated circuit generally, audit state information accessible by the security manager of an integrated circuit, program keys/keysplits, perform diagnostic activity on an in-field integrated circuit that includes the security manager, calibrate or tune analog circuits to compensate for process variation, configure a PLL for the input clock and desired operating frequency in a specific product or device that includes the integrated circuit, adjust the power and frequency of a radio(s), configure the limits enforced by an internal thermal failsafe (thermal limits may vary based on the packaging and cooling solution used in different products), configuring a battery charging circuit, etc. Thus, the privileges may correspond to functionality, operations, or configurations of the integrated circuit. The processing logic may update a memory based on the one or more privileges that are being delegated (i.e., assigned) to the delegate entity (block 320). For example, the processing logic may program the memory to include an entry or information that includes identification information of the delegate entity as well as which privileges have been assigned to the delegate entity.

The processing logic may further receive a request to revoke privileges assigned to a root entity (block 330). For example, the request may be received from the root entity. In some embodiments, the root entity may issue such a request after the integrated circuit that includes the security manager has been transferred to a new entity. In the same or alternative embodiments, the root entity may be an entity that possesses a private key of a public-key pair where the public key is stored in the integrated circuit (e.g., in memory or within the circuitry as defined by a mask provided to a manufacturer of the integrated circuit) and the private key is provided to identify the root entity. The processing logic may further update the memory based on the revocation of the privileges assigned to the root entity (block 340). For example, the memory may be programmed to remove or eliminate privileges assigned to the root entity in response to the request to revoke the privileges by the root entity.

Thus, privileges associated with functionality or operations of an integrated circuit may be assigned to various entities or existing privileges assigned to entities may be revoked by programming a memory of the integrated circuit. Accordingly, the integrated circuit includes a memory that is used to store privileges and is updated to reflect changes in entities that are in possession of the integrated circuit.

Figure 4:
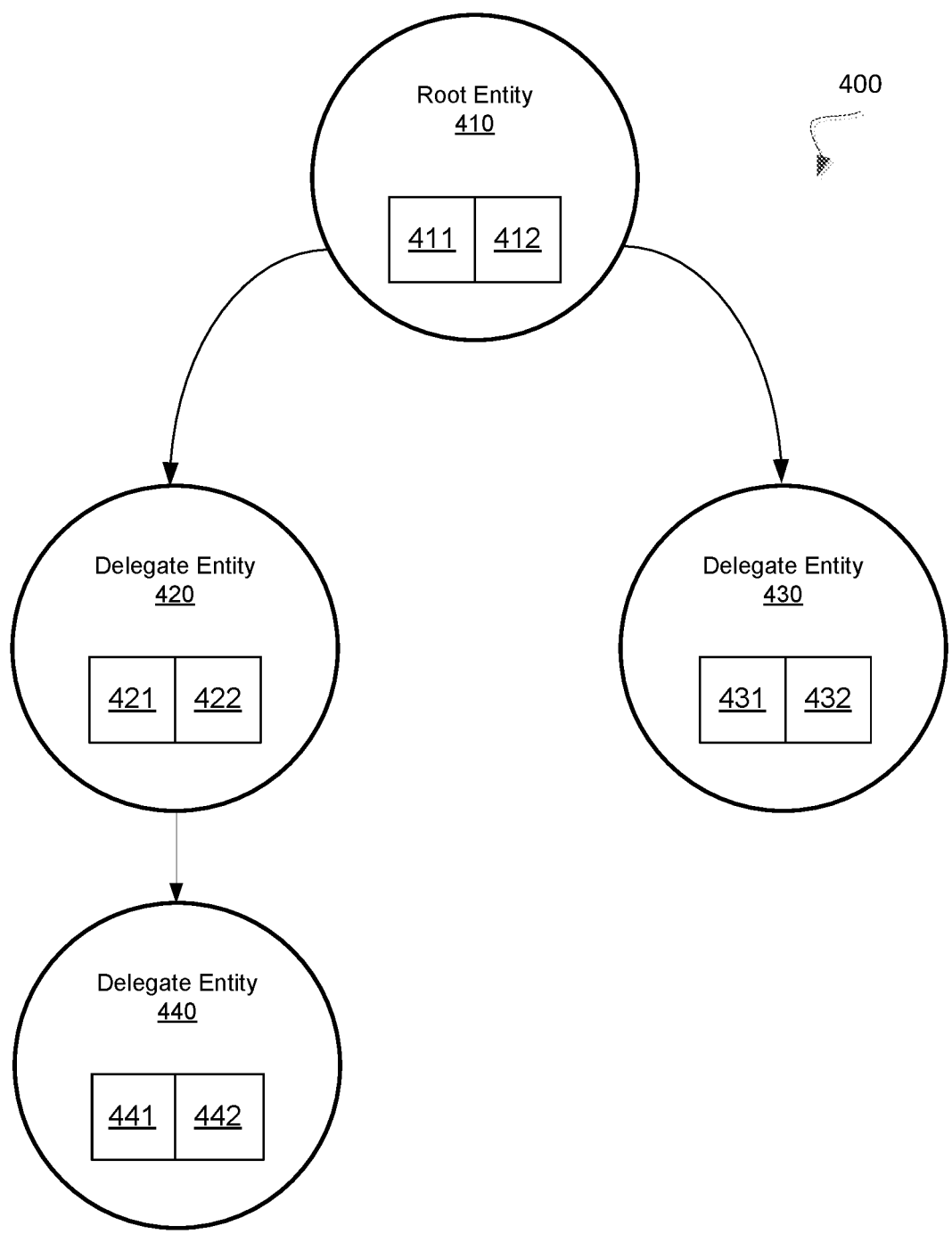
FIG. 4 illustrates an example root entity and delegate entity hierarchy in accordance with some embodiments.

FIG. 4 illustrates an example root entity and delegate entity hierarchy 400. In general, the hierarchy 400 illustrates the assigning of privileges to a root entity and multiple delegate entities and the programming of a memory to reflect the assignment of the privileges. The hierarchy 400 may be implemented by the security manager 160 or 200 of FIGS. 1 and/or 2.

As shown in FIG. 4, the hierarchy 400 includes a root entity 410 and delegate entities 420, 430, and 440. The root entity may be assigned privileges associated with a root authority. For example, a memory of an integrated circuit may include entries 411 and 412 of a memory corresponding to privileges assigned to the root entity 410. The entries 411 and 412 may specify that the root entity 410 has been assigned a first privilege and a second privilege associated with functionality or operations of the integrated circuit. Such privileges may include access to all functionality or operations of an integrated circuit by the root entity. The root entity 410 may issue a request to assign privileges of a first subset of the functionality or operations of the integrated circuit to the delegate entity 420 and to the delegate entity 430. However, in some embodiments, the root entity 410 may assign privileges of different subsets of the functionality or operations of the integrated circuit to the delegate entity 420 and the delegate entity 430. For example, privileges for a first subset of functionality or operations of the integrated circuit may be assigned to the delegate entity 420 by programming a memory with entries 421 and 422 and privileges for a second subset of functionality or operations of the integrated circuit may be assigned to the delegate entity 430 by the programming of the memory with entries 431 and 432. The entries 411, 412, 421, 422, 431, 432, 441, and 442 may all be programmed into the same memory.

The privileges assigned to a delegate entity may either be further assigned to another delegate entity by the delegate entity that was assigned the privileges or the delegate entity that was assigned the privileges may be prevented from being assigned to another delegate entity. A privilege assigned to a delegate entity that cannot be further assigned to another delegate entity by the delegate entity that was assigned the privilege may be referred to as a terminal delegation. For example, a terminal delegation may involve the assigning of a privilege to a first delegate entity where the first delegate entity may not be allowed to assign the first privilege to a second delegate entity. Furthermore, a privilege that is assigned to a delegate entity that can be further assigned to another delegate entity may be referred to as a non-terminal delegation. In some embodiments, a non-terminal delegation of a privilege to a delegate entity may result in the delegate entity exercising the privilege (e.g., accessing a functionality or operation of the integrated circuit corresponding to the privilege) but may not further delegate or assign the same privilege to another delegate entity.

Referring to FIG. 4, the root entity 410 may assign privileges to the delegate entity 430 through a terminal delegation. In some embodiments, the entries 431 and 432 of the delegate entity 430 may identify that the privileges that were assigned to the delegate entity 430 may not be assigned to another delegate entity by the delegate entity 430. However, the root entity 410 may have assigned privileges to the delegate entity 420 through a non-terminal delegation and the entries 421 and 422 may indicate that the delegate entity 420 may further assign the privileges to another entity such as delegate entity 440. Thus, the entries 441 and 442 of the memory of the integrated circuit may be updated or programmed to identify the assigned privileges to the delegate entity 440.

In some embodiments, privileges may be revoked. For example, the privileges assigned to the root entity 410 may be revoked. In response to the revocation of the privileges assigned to the root entity 410, the entries 411 and 412 of the memory may be programmed or updated to reflect that the root entity 410 is no longer assigned the corresponding privileges. Privileges may also be transferred from one entity to another entity. Such an action may be referred to as a transfer delegation. For example, a privilege that is assigned to the delegate entity 420 may be transferred to the delegate entity 440. In such a case, an entry of the memory for the delegate entity 420 may be programmed or updated to reflect that the delegate entity 420 is no longer assigned the transferred privilege and an entry of the memory for the delegate entity 440 may be programmed or updated to indicate that the delegate entity 440 has been assigned the transferred privilege. For example, the entries 441 and 442 may be updated for the delegate entity 440, and the entries 421 and 422 updated for the delegate entity 420.

In some embodiments, the root entity 410 may create a root signed block (RSB) and one or more of the delegate entities 420, 430, and 440 may create a delegate signed block (DSB). An RSB may be a data packet that is digitally signed by the root entity. In some embodiments, the RSB may contain one or more commands, keys, privileges assigned to one or more delegate entities by the root entity, or some combination thereof, to be used by the security manager. A DSB may be a data packet that is digitally signed by a delegate entity. In some embodiments, the DSB may be signed by a delegate entity with an associated digital certificate that is contained in the RSB and may contain one or more commands, keys, privileges assigned to one or more other delegate entities by the delegate entity digitally signing the DSB, or some combination thereof, to also be used by the security manager. In some embodiments, the RSB and any DSB may be stored in a memory that also stores information associated with privileges that are assigned to various entities. The RSB may direct the security manager of an integrated circuit to perform one or more actions (e.g., accessing of a functionality or an operation of the integrated circuit). For example, the root entity 410 may create the RSB (e.g., a delegation message). The RSB may include information identifying a set of privileges that may be exercised by the delegate entity as well as conditions under which the set of privileges may be conveyed or delegated to other delegate entities. The DSB may be created by a delegate entity and may be used in conjunction with the RSB. For example, the DSB may direct the security manager to perform one or more actions based on the information included in the RSB or DSB. For example, when receiving a request from a delegate entity, the security manager may execute the one or more actions specified by the DSB by verifying information in the RSB that was created by the root entity 410. Thus, in order to have the security manager perform an action, the delegate entity may provide the DSB and the RSB and the security manager may verify that the requested action is permissible based on the DSB and the RSB. As an example, when a delegate entity seeks to access a functionality or operation of the integrated circuit, the delegate entity may provide a DSB and an RSB to the security manager which may verify the validity of the DSB and the RSB. Furthermore, the security manager may verify that the DSB includes information that identifies that the delegate entity has been assigned a privilege corresponding to the functionality or operation that it seeks to access and the security manager may further verify that the RSB includes information that identifies that the root entity assigned such a privilege to the delegate entity. Accordingly, for a delegate entity to perform an action, the security manager may verify contents of the DSB as well as the contents of the RSB. For example, the security manager may retrieve the RSB and the DSB from the memory (e.g., the same memory that stores information associated with assigned privileges) and then verify the RSB and the DSB.

As previously discussed, a delegate entity may assign a privilege to another delegate entity (e.g., through a transfer delegation or a non-terminal delegation). Thus, a root entity may provide an RSB, a first delegate entity may provide a first DSB, and the second delegate entity may provide a second DSB. The security manager may receive the second DSB, first DSB, and the RSB and verify the contents of each of the DSBs and the RSB when the second delegate entity seeks to access a functionality or operation of the integrated circuit. For example, the security manager may first verify that the second delegate has been assigned a privilege corresponding to the functionality or operation of the integrated circuit by using the second DSB, then the security manager may verify that the first delegate entity has assigned the corresponding privilege to the second delegate entity by using the first DSB, and then the security manager may verify that the root entity has assigned a non-terminal delegation of the privilege to the first delegate entity by using the RSB Thus, a chain of DSBs and an RSB may be used when a delegate entity has been assigned a privilege through a non-terminal delegation.

Figure 5:
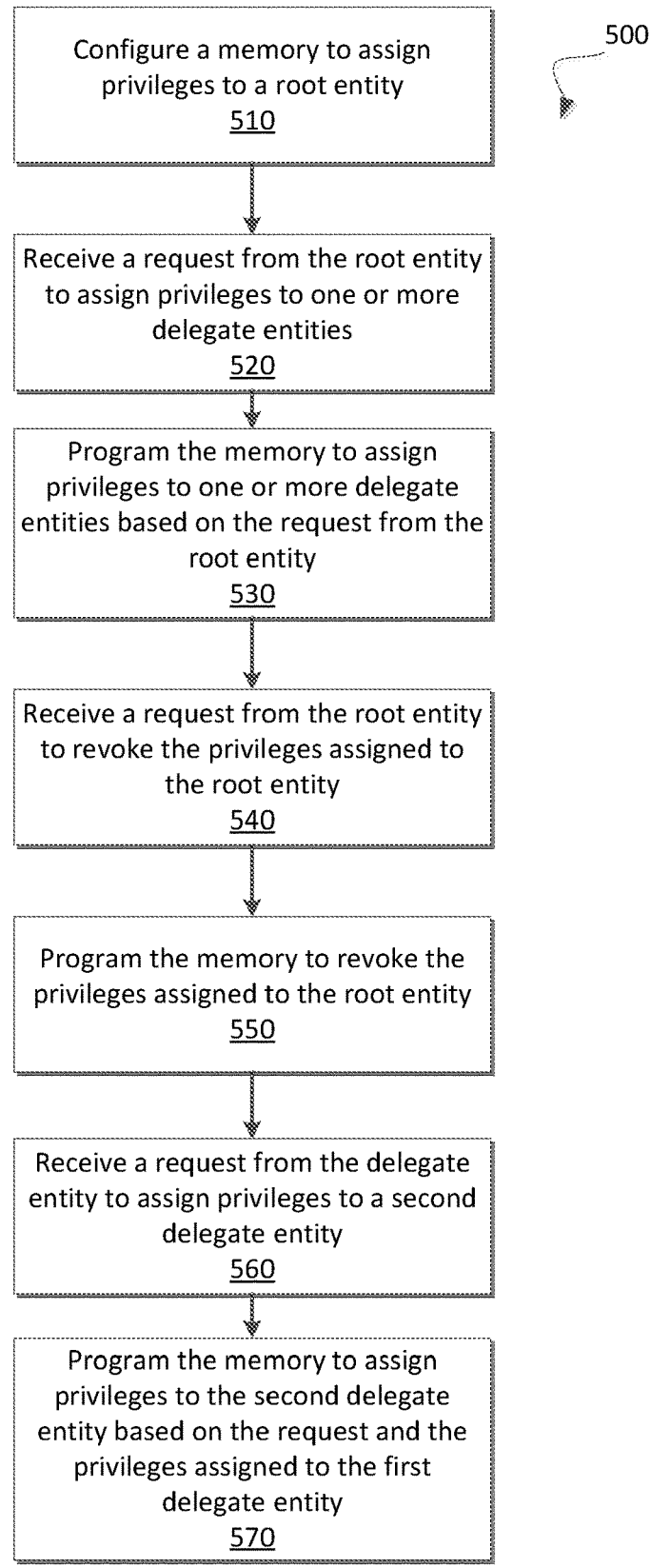
FIG. 5 is a flow diagram of an example method to configure a memory based on privileges for different entities in accordance with some embodiments.

FIG. 5 is a flow diagram of an example method 500 to program a memory based on privileges for different entities. In general, the method 500 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 500 may be performed by the security manager 160 and the security manager 200 of FIGS. 1 and/or 2.

As shown in FIG. 5, the method 500 may begin with the processing logic programming a memory to assign privileges to a root entity (block 510). For example, a root entity may transmit a request to assign the root authority privileges to the root entity. In some embodiments, such assignment of the privileges may occur during or after manufacturing of an integrated circuit that includes the security manager. The processing logic may receive a request from the root entity to assign privileges to one or more delegate entities (block 520). For example, the root entity may request privileges to be assigned to a delegate entity based on a terminal delegation or a non-terminal delegation. The processing logic may program the memory to assign privileges to one or more delegate entities based on the request from the root entity (block 530). For example, the same memory that is programmed to assign privileges to the root entity may further be programmed to assign privileges to one or more of the delegate entities. The processing logic may receive a request from the root entity to revoke the privileges assigned to the root entity (block 540). For example, the root entity itself may transmit such a request to the security manager associated with an integrated circuit. The processing logic may program the memory to revoke the privileges assigned to the root entity (block 550). For example, in response to the revocation request, the same memory that is used to store privileges assigned to the root entity and the one or more delegates may be programmed so that the privileges assigned to the root entity are eliminated or removed. Examples of revoking such privileges in a memory are disclosed with regard to FIGS. 6A-6C. The processing logic may further receive a request from a delegate entity to assign privileges to a second delegate entity (block 560). In response to such a request, the processing logic may program the memory to assign privileges to the second delegate entity based on the request and the privileges that have been assigned to the first delegate entity (block 570). For example, in order for the first delegate entity to assign privileges to the second delegate entity, the processing logic may verify that the first delegate entity is allowed to assign the privilege to another delegate entity and that the first delegate entity was assigned such a privilege. For example, the processing logic may receive an RSB created by the root entity to verify that the root entity has assigned a privilege to the first delegate entity and that the privilege is a non-terminal delegation after verifying that the first delegate entity has been assigned the privilege.

Figure 6A:
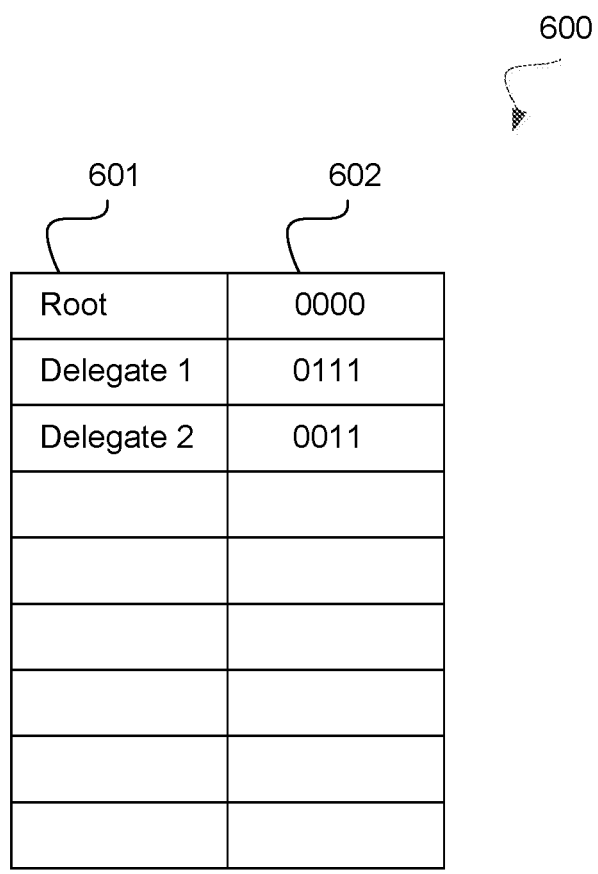
FIG. 6A illustrates a diagram of an example memory storing information associated with privileges of different entities in accordance with some embodiments.

FIG. 6A illustrates a diagram of an example memory 600 storing information associated with privileges of different entities. In general, the memory 600 may be associated with a security manager 160 and the security manager 200 of FIGS. 1 and/or 2.

As shown in FIG. 6A, the memory 600 may include a column 601 identifying entities and a column 602 identifying privileges associated with the entities of column 601. For example, the memory 600 may include a first entry corresponding to a root entity, a second entry corresponding to a first delegate entity, and a third entry corresponding to a third delegate entity. In some embodiments, the memory 600 may be a one-time programmable (OTP) memory where the programming or setting of a bit of the memory may only be performed once. For example, if a bit is not programmed or configured, then the value of the bit of the OTP memory may be at a first value of '0' and if the bit is programmed or configured, then the value of the bit of the OTP memory may be a second value of '1' (or vice versa). In some embodiments, if a value of a bit corresponding to a privilege is at a first value that is associated with a bit that is not programmed (e.g., a value of '0'), then the bit may indicate that the corresponding entity has been assigned the corresponding privilege. For example, as shown in FIG. 6A, the root entity may be assigned four privileges where each privilege corresponds to a single bit of the column 602. Additionally, the first delegate entity may be assigned a first privilege based on the first bit that has not been programmed and the second delegate entity may be assigned the first privilege and a second privilege.

Figure 6B:
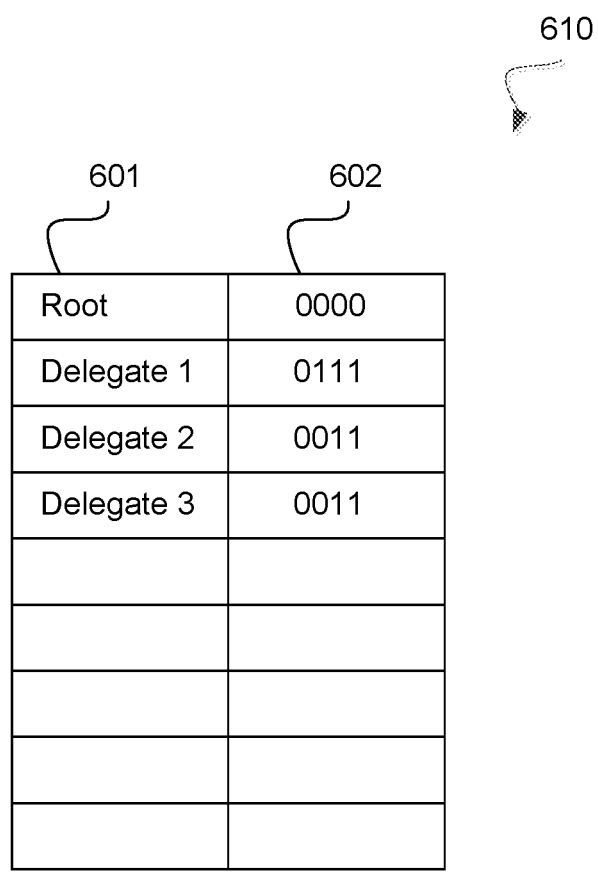
FIG. 6B illustrates a diagram of an example memory storing information associated with privileges of different entities after the assigning of privileges to another delegate entity in accordance with some embodiments.

FIG. 6B illustrates a diagram of an example memory 610 storing information associated with privileges of different entities after the assigning of privileges to another delegate entity. In general, the memory 610 may be associated with a security manager 160 and the security manager 200 of FIGS. 1 and/or 2. The memory 610 may correspond to the memory 600 after the assigning of privileges to another delegate entity.

As shown in FIG. 6B, the memory 610 may include a new entry associated with a third delegate entity that has been assigned the first privilege and the second privilege. In some embodiments, the root entity may assign the first and second privileges to the third delegate entity. However, in the same or alternative embodiments, the second delegate entity may have assigned the first and second privilege to the third delegate entity if the privileges assigned to the second delegate entity are associated with a non-terminal delegation. A security manager may verify contents of an RSB and a DSB when the second delegate entity seeks to assign privileges to another delegate entity.

Figure 6C:
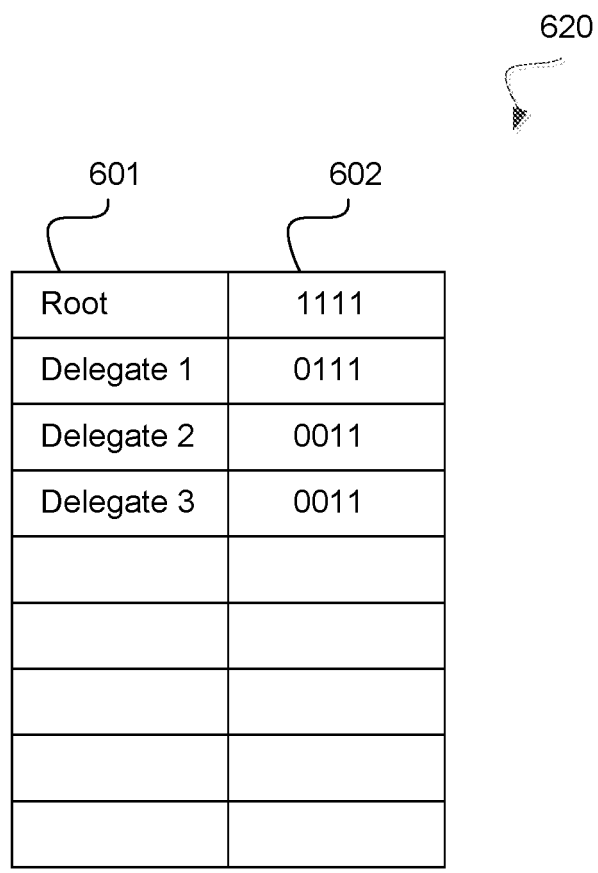
FIG. 6C illustrates a diagram of an example memory storing information associated with privileges of different entities after the revoking of privileges assigned to a root entity in accordance with some embodiments.

FIG. 6C illustrates a diagram of an example memory 620 storing information associated with privileges of different entities after the revoking of privileges assigned to a root entity. In general, the memory 620 may be associated with a security manager 160 and the security manager 200 of FIGS. 1 and/or 2. The memory 620 may correspond to the memory 610 after the revocation of privileges assigned to the root entity.

As shown in FIG. 6C, the memory 620 may be programmed to eliminate or revoke privileges that were assigned to the root entity. For example, each bit of the OTP memory may be programmed or configured to a value of '1' that indicates that the privilege is not assigned to the root entity. Accordingly, in some embodiments, the revocation of the privileges of a root entity may include the programming or configuring of all bits of an entry or a portion of the OTP memory that corresponds to the privileges of the root entity. For example, each bit of the OTP memory that identifies privileges assigned to the root entity may be programmed from a first value to a second value. In some embodiments, a particular bit of the OTP memory may be programmed from the first value to the second value based on the use of a fuse or an antifuse associated with the bit of the OTP memory. In general, OTP memory may be a type of digital memory where the setting of each bit of the OTP memory is locked by a fuse (e.g., an electrical fuse associated with a low resistance and designed to permanently break an electrically conductive path after the programming or setting of a corresponding bit) or an antifuse (e.g., an electrical component associated with an initial high resistance and designed to permanently create an electrically conductive path after the programming or setting of a corresponding bit). As an example, each bit of the OTP memory may start with an initial value of '0' and may be programmed or set to a later value of '1' (or vice versa). Thus, in order to program or set a key with a value of '10001' into the OTP memory, two bits of the OTP memory may be programmed from the initial value of '0' to the later value of '1.' Once the two bits of the OTP memory have been programmed to the later value of '1', then the two bits may not be programmed back to the value of '0.'

Although FIGS. 6A-6C illustrates a memory storing information corresponding to privileges assigned to entities as a bit value corresponding to each privilege, the memory may store the information corresponding to privileges in alternative ways. For example, a hash value of the information corresponding to privileges may be stored in a memory and when accessed by the security manager, the full list of privileges may be determined based on the hash value. In some embodiments, information corresponding to a privilege may be based on multiple bits. For example, a first bit corresponding to a privilege may indicate whether or not the privilege has been assigned to a particular entity and a second bit may indicate whether or not the privilege can be delegated or assigned to another delegate entity. For example, when the first bit is at a first value that indicates that the delegate entity has been assigned a particular privilege and the second bit is at the first value that indicates that the delegate entity may assign the particular privilege to another delegate entity, then the delegate entity may be allowed to assign the privilege to another delegate entity. However, if the second bit is at a second value that indicates that the delegate entity may not assign the particular privilege to another delegate entity, then the delegate entity may not be allowed to assign the privilege to another delegate entity.

Figure 7:
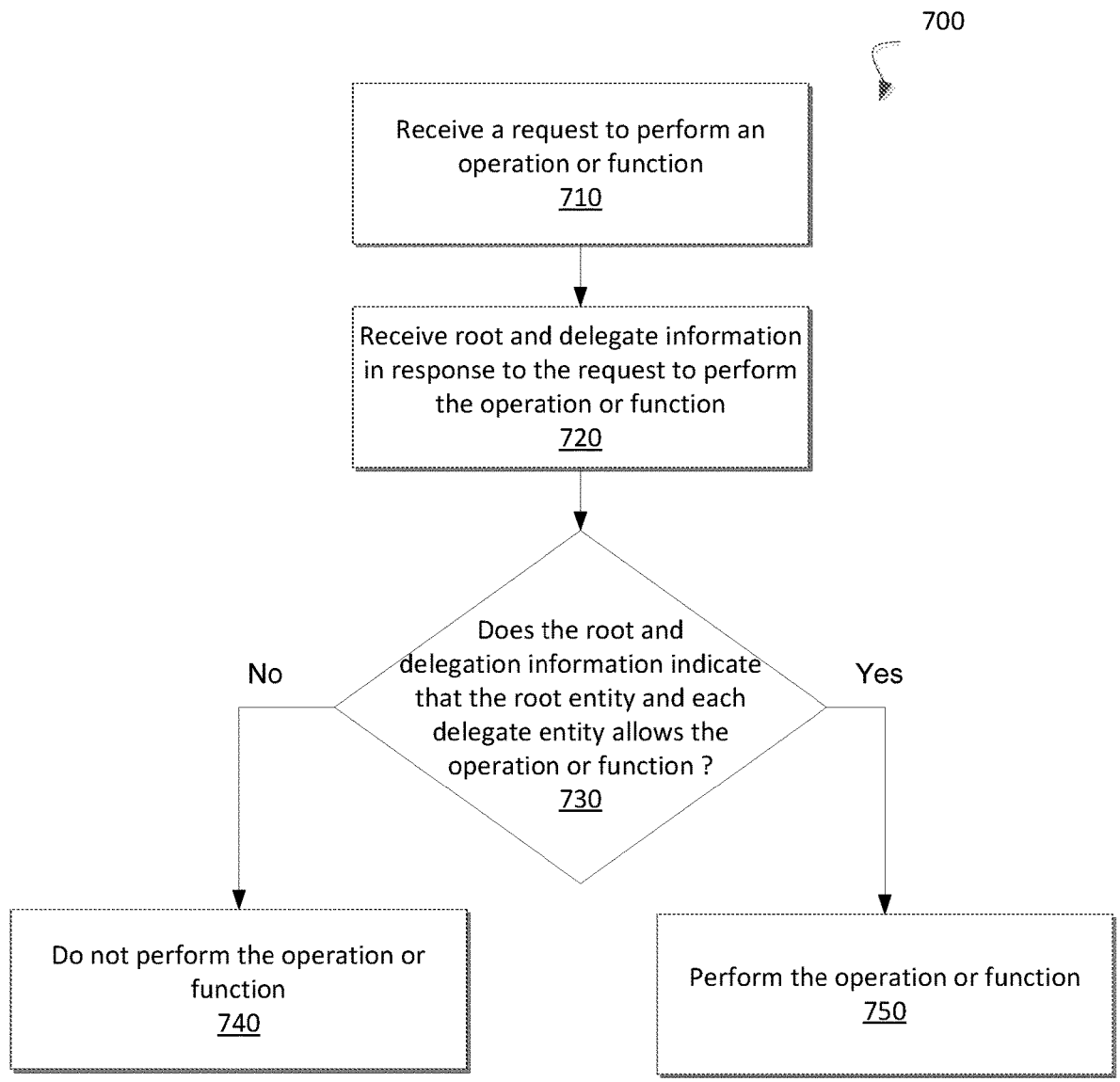
FIG. 7 is a flow diagram of an example method to perform an operation or function associated with an integrated circuit based on information from different entities in accordance with some embodiments of the present disclosure.

FIG. 7 is a flow diagram of an example method 700 to perform an operation or function associated with an integrated circuit based on information from different entities. In general, the method 700 may be performed by processing logic that may comprise hardware (e.g., processing device, circuitry, dedicated logic, programmable logic, microcode, hardware of a device, etc.), software (e.g., instructions run or executed on a processing device), or a combination thereof. In some embodiments, the method 700 may be performed by the security manager 160 and/or the security manager 200 of FIGS. 1 and 2.

As shown in FIG. 7, the method 700 may begin with the processing logic receiving a request to perform a function or operation (block 710). For example, the requested function or operation may be associated with the functionality or an operation to be performed by an integrated circuit. In some embodiments, such an operation may include, but is not limited to, entering into a debug state or accessing memory associated with the integrated circuit. In the same or alternative embodiments, the operation or functionality may be a type of unlock operation (e.g., allowing access to all operations or functionality of the integrated circuit) for debug or testing purposes. The processing logic may receive root and delegate information in response to the request to perform the operation or function associated with the integrated circuit (block 720). For example, the processing logic may access a memory (e.g., the memory 600, 610, and/or 620) associated with storing privileges of a root entity and one or more delegate entities. The processing logic may determine if the root and delegate information indicates that the root entity and each of the delegate entities allows the operation or functionality of the integrated circuit to be accessed (block 730). For example, the root entity and each delegate entity may configure a security manager to program the memory to indicate that the root entity and the delegate entity will allow such an operation or function when a subsequent request to access the operation or function is received. In some embodiments, a particular bit of the memory may be reserved for each entity to program or configure the bit from a first value to a second value to indicate that the corresponding entity will allow access to the operation or function. For example, a first entity may program a first bit of the memory and a second entity may program a second bit of the memory to indicate that the first entity and the second entity allows access to the operation or function. If each of the entities does not allow the access to the operation or function and as such the root and delegate information does not indicate that the root entity and each of the delegate entities allows the operation or function (e.g., by programming a corresponding bit of the memory), then the processing logic may not perform the operation or function (block 740). However, if the root entity and each of the delegate entities has indicated that it will allow access to the operation or function (e.g., through programming a particular bit of the memory for each entity), then the processing logic may perform the operation or function (block 750). For example, a security manager may allow the operation or function of an integrated circuit to be performed. Accordingly, an entity requesting to access such an operation or function may be granted or allowed access to the operation or function when each entity indicates that the root entity may be granted access to the operation or function.

As an example, a device that includes an integrated circuit may be in the possession of a user (e.g., a consumer who has purchased the device) and the user may indicate that the device is not functioning properly and intends to hand possession of the device including the integrated circuit to another entity. The user may indicate that he or she allows a debug operation or functionality of the integrated circuit of the device to be performed for testing purposes. Accordingly, the memory associated with the integrated circuit may be programmed to indicate that the user allows the debug operation or functionality. For example, an entry of the memory that corresponds to the user (e.g., a delegate entity entry) may be modified by changing a bit value of the entry from a first value to a second value. A manufacturer of the device may receive the device from the user and may further allow the debug operation or functionality of the integrated circuit of the device to be performed for testing purposes. Accordingly, the memory may be programmed by the programming of another bit of another entry of the memory that corresponds to the manufacturer of the device (e.g., another delegate entity). Furthermore, a manufacturer of the integrated circuit may receive the device including the integrated circuit and may further program the memory by changing a bit of an entry corresponding to the manufacturer of the integrated circuit (e.g., the root entity) from the first value to the second value. Thus, since each delegate entity and the root entity has indicated that each entity allows the testing operation or function to be performed, the root entity (e.g., the manufacturer of the integrated circuit) may be allowed to perform the operation or function.

Figure 8:
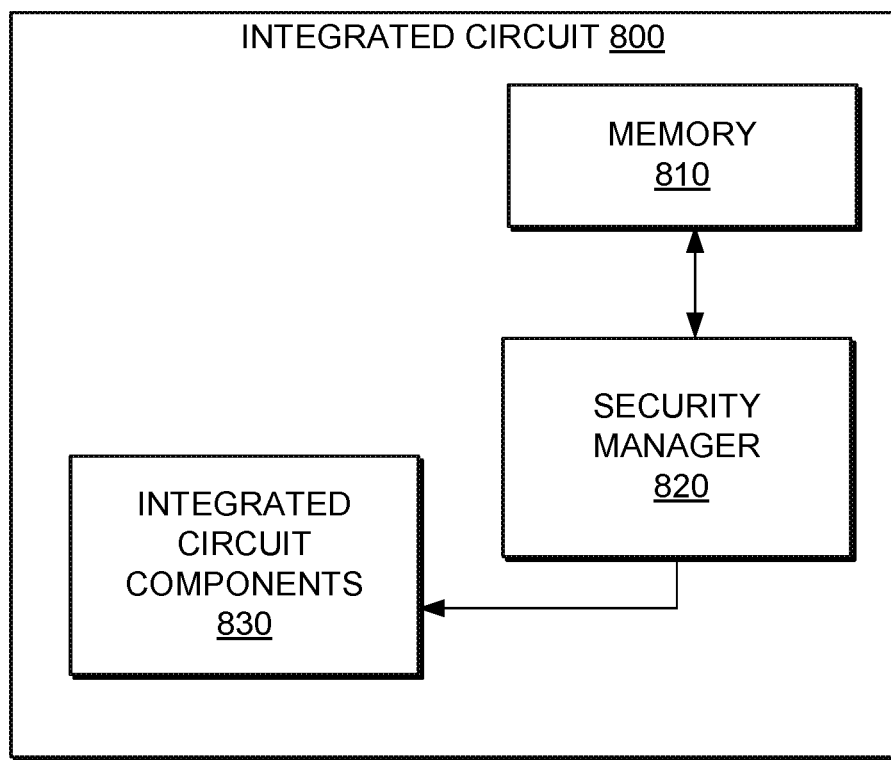
FIG. 8 is a block diagram of an example integrated circuit including a security manager in accordance with some embodiments.

FIG. 8 is a block diagram of an example integrated circuit 800 including a security manager component. In general, the integrated circuit 800 includes a security manager that corresponds to the security manager 160 and/or 200 of FIGS. 1 and 2.

The integrated circuit 800 may be incorporated into a device. Examples of the device may include, but are not limited to, a System on a Chip (SoC), field programmable gate array (FPGA), and a processor that may include the integrated circuit. As shown, the integrated circuit 800 may include a memory 810 (e.g., an OTP memory), a security manager 820, and integrated circuit components or architecture 830. In some embodiments, the memory 810 may be a type of programmable read-only memory that may store information identifying privileges that are assigned and not assigned to various entities. The integrated circuit 800 may further include a security manager 820, as previously described. In some embodiments, the integrated circuit 800 may further include integrated circuit components or architecture 830. The integrated circuit components or architecture 830 may include a central processing unit (CPU) or other type of processing device, memory, or other such circuit components. The functionality of the integrated circuit or operations of the integrated circuit that are associated with assigned privileges may be performed by the integrated circuit components 830. As an example, an entity (e.g., a root entity or delegate entity) may transmit a request to access a functionality or operation of the integrated circuit components 830. In response to such a request, the security manager 820 may verify if the requesting entity has been assigned privileges that allow access to the functionality or operation. For example, the security manager 820 may receive privilege information associated with the requesting entity from the memory 810. If the received privilege information indicates that the requesting entity has been assigned a privilege corresponding to the functionality or operation of the integrated circuit, then the integrated circuit components 830 may allow access to a portion of its functionality or perform a particular operation.

Figure 9:
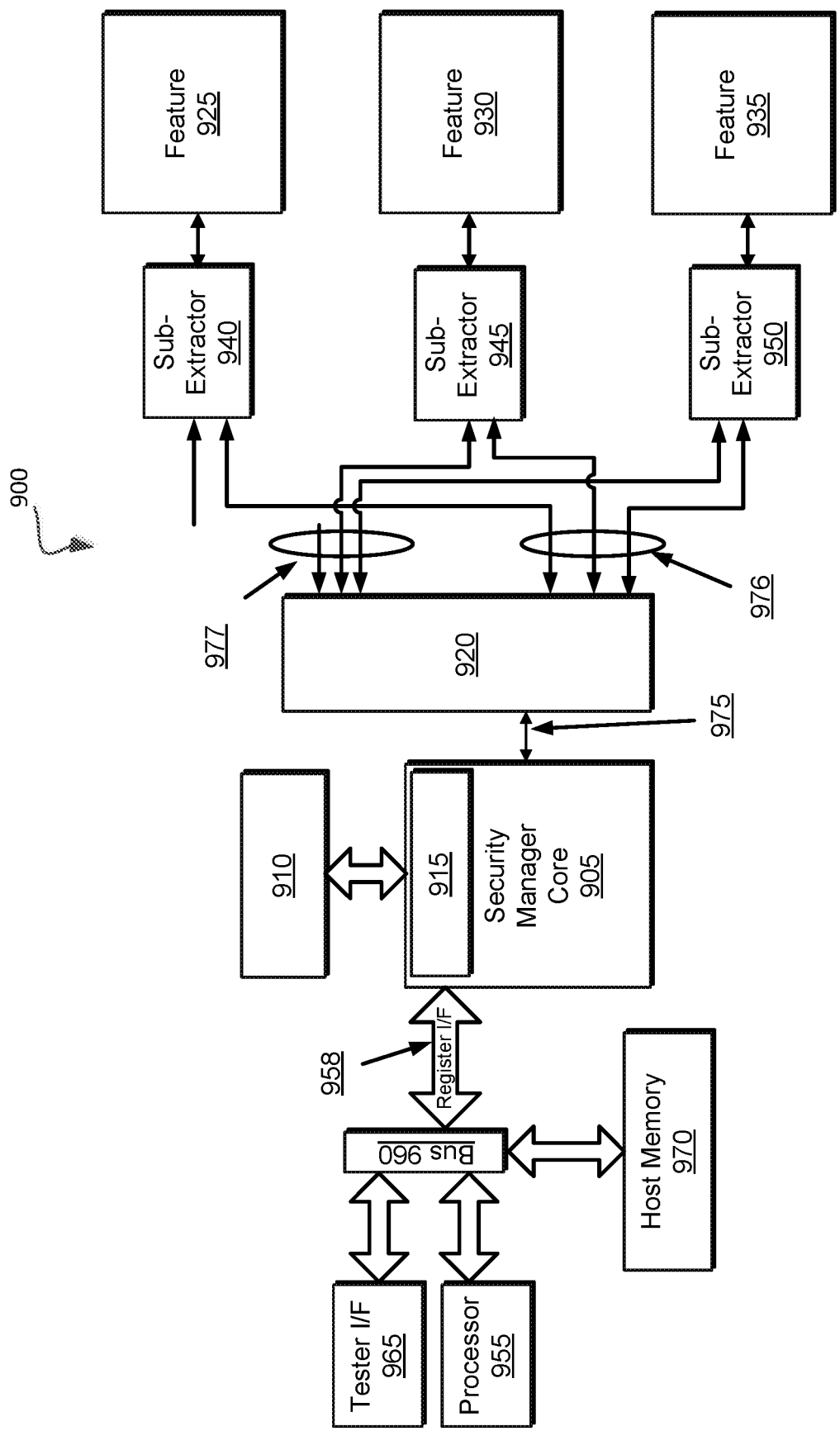
FIG. 9 is a block diagram of an example system including a security manager in accordance with some embodiments.

FIG. 9 is a block diagram of an example system 900 including a security manager. In general, the security manager of the system 900 may correspond to the security manager 160 and/or security manager 200 of FIGS. 1 and 2. The system 900 may correspond to an integrated circuit or a device that includes an integrated circuit.

The system 900 may include a security manager for performing methods described herein. System 900 may include a security manager (SM) core 905, a secure memory 910, an extractor 920, a bus 960, a processor 955, an extractor interface 925, a key interface 976, a configuration value interface 977, a host memory 970, features 925, 930, and 935, sub-extractors 940, 945, and 950, register interface 958, tester interface 965, or some combination thereof. The security manager-enabled integrated circuit (IC) includes SM core 905 and secure memory 910, and optionally may include some (or all) of the other elements shown of system 900 (e.g., extractor 920, bus 960, processor 955, extractor interface 925, sub-extractors 940, 945, and 950, key interface 976, configuration value interface 977, a host memory 970, Features 925, 930, and 935, etc.). Although only one of each component is shown, it should be understood that system 900 may comprise more than one of any of the named components. For example, system 900 may have multiple processors 955. Similarly, although the system 900 is shown with a single SM core 905, SM-enabled IC may contain multiple security manager cores 905. Further, in some embodiments, system 900 may include tester interface ("I/F") 965 that may be operatively coupled (such as communicatively coupled using optical, electrical, or wireless transmission) to a tester. In some embodiments that are not shown, one or more sub-extractors 940, 945, and 950 may be combined with extractor 920.

Additionally, in some embodiments, the security manager core 905 may directly connect with one or more features, and if all such connections are handled directly, extractor 920 and the sub-extractors may not be required. And in some embodiments, features 925, 930, and 935 may continue to be connected using extractor 920, the one or more sub-extractors (e.g., 940, 945, and 950), and the interfaces (925, 976, 977).

Additionally, SM core 905 may directly read and write signals to other components of system 900. In some embodiments, SM core 905 may sample the system state, read data parameters, etc. via, for example, a dedicated interface (not shown) or via bus 960. For example, SM core 905 may issue read operations over bus 960 to obtain the desired information.

System 900 includes secure memory 910. Secure memory 910 can be a single secure memory and/or multiple homogenous or heterogeneous secure memories. Secure memory 910 may be a form of a digital memory where the setting of each bit may be fixed in a nonvolatile form. Secure memory 910 may include, for example, fuse memory, antifuse memory, one time programmable ("OTP") memory, erasable programmable read only memory ("EPROM"), electrically erasable programmable read only memory ("EEPROM"), RAM (including battery-backed RAM), or some combination thereof. In some embodiments, where secure memory 910 is fuse or anti-fuse memory, secure memory 910 may include redundant pathways that offer the ability to revise information previously stored in secure memory 910 (e.g., by overriding or remapping previously-written data). Depending on the technology and security features present, contents of secure memory 910 may be encrypted and/or authenticated, may be protected from reads by blocks other than SM core 905, may be configured to be one-time-programmable. Also, secure memory 910 may be isolated such that only SM core 905 is connected to secure memory 910, or such that other components of the SM-enabled IC may read from secure memory 910 but only SM core 905 may write to secure memory 910. Secure memory 910 may also be partitioned into one or more portions that may be read by components of the SM-enabled IC other than SM core 905 and one or more portions that may only be ready by SM core 905. SM core 905 may be directly responsible for performing all manufacturing test and programming operations for secure memory 910. Additionally, in some embodiments, secure memory 910 is designed to resist efforts to learn its contents by, for example, removing certain layers from the IC, capturing micrographs of the IC, or electrically probing the IC during operation. Additionally, in some embodiments, SM core 905 includes wrapper 915. Wrapper 915 translates requests from SM core 905 into requests understood by secure memory 910, and vice versa. In some embodiments, secure memory 910 may be integral to SM core 905.

System 900 includes one or more features 925, 930, and 935. The inputs delivered via the sub-extractors 940, 945, 950 to features 925, 930, and 935 are generally configurable, thereby providing configurability (e.g., via key management and feature management operations) of the functionality associated with features 925, 930, and 935. Such configuration changes may be performed by SM commands (described below) delivered to SM core 905 via register interface 958.

Features 925, 930, and 935 may include hardware, software, and combinations thereof. For example, features 925, 930, and 935 may be a global positioning service, one or more processors (e.g., CPU, graphics processor, crypto core, etc.), additional memory, USB ports, video input or output ports, audio input or output ports, circuitry providing advanced graphics capabilities (e.g., picture-in-picture, multiple HD video streams, graphics acceleration, etc.), network transceivers for access to one or more networks (e.g., Wi-Fi, near field, BLUETOOTH, etc.), cameras, etc. The above listing of features should not be considered limiting, as features may include any component or capability that is configurable via key management or feature management operations. In some embodiments, a feature or part of a feature is provided by a third party IP provider. Features 925, 930, and 935 are associated with sub-extractors 940, 945, and 950, respectively. In some embodiments not shown, multiple features may share a single sub-extractor. Sub-extractors 940, 945, and 950 facilitate the delivery of SM core outputs (such as configuration values and keys) across SM-enabled IC designs. Additionally, as discussed above, sub-extractors 940, 945, and 950 are optional, and are generally used for large or complex SM-enabled ICs (including those where top-level ASIC floorplanning and/or routing are challenging) that include multiple features. Extractor 920 is configured to deliver outputs from SM core 905 to sub-extractors 940, 945, and 950, which in turn deliver signals to features 925, 930, and 935, respectively. In some embodiments, the features may correspond to a functionality or operation of an integrated circuit.

System 900 includes extractor 920. Extractor 920 is a hardware component that is configured to receive and route information (e.g., keys and feature state) from SM core 905 to the appropriate sub-extractor(s) associated with an intended destination Feature, in a form that is appropriate for the feature. Feature state refers to information that has been processed by SM-core 905 and possibly extractor 920 such that it is in a form that is understandable by the destination feature. Feature state may have one or more associated addresses in feature space. By way of example, the feature state may include enable signals, metadata, configuration or calibration information, or other data which is useful to features.

Extractor 920 is operatively coupled to SM core 905, and to one or more features (e.g., feature 925, feature 930, and feature 935). In some embodiments, extractor 920 is coupled to SM core 905 via an extractor interface 925. Extractor interface 925 provides communication of information (such as feature data, security keys, and the like) from SM core 905 to extractor 920. Feature data may be secret or non-secret, and is general data that is used to configure a feature. Extractor interface 925 may include wires which couple SM core 905 to extractor 920. Extractor 920 then transfers the information to the sub-extractor(s) associated with each destination feature via key interface 976, configuration value interface 977, or a combination thereof. Key interface 976 is a communication path configured to pass secret information (e.g., cryptographic keys, such as private keys to public key systems such as RSA and EC-DSA, symmetric keys to cryptosystems such as AES or triple DES, and keys for protocols such as HDCP or EMV). For example, extractor 920 may communicate a 128-bit key and target key address to one or more features (e.g., 925, 930, and/or 950) via key interface 976. Extractor 920 may be configured to decode a target address to identify a particular sub-extractor associated with the destination feature. For example, sub-extractor 940, sub-extractor 945, and sub-extractor 950 are associated with features 925, 930, and 935, respectively. Configuration value interface 977 is a communication path configured to pass feature data associated with feature management operations. For example, if one or more features (e.g., 925, 930, 935, or some combination thereof) are being configured or enabled, extractor 920 passes the feature data to the appropriate sub-extractor via configuration value interface 977. Likewise, if a particular feature does not require (and/or for security reasons may not be permitted to receive) the values associated with given addresses, the extractor and/or sub-extractor can withhold these values from the destinations. Withholding unnecessary values can improve efficiency on ASICs by avoiding the unnecessary routing and delivery of values to sub-extractors or features that do not need them. In some embodiments, extractor interface 925 provides bi-directional communication of information from SM core 905 to extractor 920. In other embodiments, extractor interface 925 provides one-way communication of information from SM core 905 to extractor 920. Key interface 976 and configuration value interface 977 may include wires which couple SM extractor 920 to one or more sub-extractors 240, 234, and 950.

Extractor interface 925, key interface 976, and configuration value interface 977, or some combination thereof, couple SM core 905 to extractor 920 and sub-extractors 940, 945, and 950. The combination of interfaces may transmit data from SM core 905 to an particular feature by, for example, continuously sending data values, sending data when a change-of-value event occurs (e.g., enable feature) or a request is received (e.g., because a feature is powering on), or some combination thereof.

The current value of each element of the feature space associated with an SM core may be stored in, for example, secure memory 910, or SM private memories (discussed below). In some embodiments, a given operation (for example, processing of an RSB or DSB, discussed below) may update only a subset of the elements of the feature space. In embodiments where change-of-value events are communicated from SM core 905 to extractor 920, it is expected (although not required) that only the values of elements of feature space affected by a particular payload are communicated from SM core 905 to extractor 920 upon processing of that payload. In embodiments where all of the values in feature space are driven continuously from SM core 905 to extractor 920, the values affected by a particular payload may be combined with prior values of unaffected feature space from e.g. SM private memory for communication to extractor 920.

System 900 may include processor 955. Processor 955 can, for example, be a single or multiple microprocessors, field programmable gate array (FPGA) elements, or digital signal processors (DSPs). Specific examples of processor 955 are, for example, an x86 processor, an ARM processor, a MIPS microprocessor, a microcontroller, etc. Processor 955 may be coupled to SM core 905, host memory 970, tester I/F 965, or some combination thereof, via bus 960. In some embodiments, processor 955 may be configured to directly communicate with SM core 905, read and program secure memory 910 via SM core 905, retrieve SM core 905 status and system state, send commands to SM core 905, receive from SM core 905 cryptographic hashes of software (such as boot routines, operating system components, applications, etc.) authorized for execution by processor 955, or some combination thereof. Additionally, there may a plurality of processors performing these accesses. Additionally, in some embodiments, processor 955 has the capability to run higher privileged code, for example, in Ring 0, using ARM TrustZone®, or in a secure virtual machine monitor (SVMM). Lower-privileged processor 955 or process may be blocked using some or all capabilities of SM core 905. Register interface 958 may be used to communicate the identity and privilege level of the request, and SM core 905 can take the privilege level of the requestor into account when accepting and processing SM commands received across register interface 958.

System 900 may include host memory 970. Host memory 970 may be volatile (e.g., SRAM, DRAM, or other semiconductor memory) or non-volatile (e.g., hard disk, R/W optical disk, flash drive), or some combination thereof. Host memory 970 is operatively coupled to processor 955, SM core 905, tester I/F 965, or some combination thereof. In this embodiment, host memory 970 is coupled to one or more components of system 900 via bus 960.

System 900 may include tester I/F 965. Tester I/F 965 is an interface for tester system(s) (not shown). Tester I/F 965 may be, for example, configured to provide a communication path to SM core 905 when SM core 905 is in a manufacturing state, when the SM-enabled IC is in-field, when processor 955 is not yet operating (or is malfunctioning), or some combination thereof. Tester I/F 965 may be a scan interface, a test interface, joint test action group ("JTAG") interface, universal serial bus interface, advanced peripheral bus ("APB") interface, etc. A tester system may be coupled to system 900 such that it is able to test system 900 for correct operation. For example, the tester system can be configured to ensure that system 900 is properly enabling features, disabling features, programming secure memory 910, etc. The tester system may include one or more processors and a memory, and may communicate with (or include) a delegate authority system for authorizing operations in SM core 905.

System 900 includes SM core 905. SM core 905 may be operatively coupled to secure memory 910, extractor 920, and processor 955, host memory 970, and tester I/F 965 via register interface ("I/F") 958 and bus 960. Additionally, in some embodiments (not shown) SM core 905 may be directly connected to some or all of, processor 955, host memory 970, and tester I/F 965. SM core 905 includes one or more SM private memories (not shown). These one or more private memories may be used to store data used by the SM core, including one or more security keys (e.g., base keys, personalization keys, transport keys, netlist keys, root or delegate authority public keys, etc.), one or more pointers to locations within secure memory 910, instructions for wrapper 915, current configuration state associated with feature addresses, command processing intermediates, etc. In some embodiments, one or more security keys and a product chip ID may hard-wired into SM core 905 (e.g. root-authority public keys, base keys that must be available if secure memory 910 is malfunctioning or unconfigured, etc.). The one or more security keys may include symmetric keys, public asymmetric keys, private asymmetric keys, or some combination thereof. In some embodiments, the one or more security keys are specific to the SM core, and others may be shared among a series of SM cores. An SM core series refers to a set of SM cores which may be related in some way. For example, the SM cores in all of the SM-enabled ICs manufactured from a given mask design might be considered a series. Alternatively, all of the SM cores in any of a family of similar SM-enabled ICs might be considered a series.

In an exemplary embodiment, SM core 905 is configured to receive one or more signed blocks, which may include a root-signed block ("RSB") as well as zero or more delegate signed blocks ("DSBs"), as previously described. SM core 905 is configured to verify signatures associated with the signed blocks and extract an associated payload specifying restrictions/bindings (see below) as well as values (e.g., configuration settings or keys) intended for one or more features (e.g., 925, 930, 935). Examples of restrictions include limitations on which SM cores should accept the payload (such as limitations designating a specific device ID, or required states for values stored in feature address space, or limitations on which features can be manipulated, etc.) SM core 905 may be configured to authenticate the payload using a public key of the root authority, and to extract (e.g., decrypt) the payload from the signed blocks using, for example, a private key built into the SM-enabled IC or derived from values stored in secure memory 210. SM core 905 is configured to distribute some or the results of processing the payload to the intended one or more features (e.g., 925, 930, 935) via extractor 920.

In some embodiments, SM core 905 may be configured to execute instructions that update the feature state of the SM-enabled IC, facilitate key delivery to Features, enable configuration of secure memory 910 (such as to configure parameters necessary for writing to the secure memory 910, if any), etc. For example, SM core 905 may be instructed to disable feature 925 and enable feature 930. Depending on the embodiment and the instructions provided, SM core 905 may make persistent changes (e.g., by updating secure memory 910), non-persistent changes (e.g., by updating the SM private memory), or both. Persistent changes are those which persist after the SM-enabled IC is powered down, such that the change persists after the IC enable chip re-boots. Non-persistent changes are those which last for a predetermined period of time or events. For example, a non-persistent change may only be good for a certain number of executions, until power is lost on the device, etc. SM core 905 may be configured for managing and delivering keys for secure digital ("SD") card encryption, flash memory/hard disk encryption, high-bandwidth digital content protection ("HDCP"), digital rights management ("DRM") systems, virtual private network(s) ("VPN"), payment instruments (e.g., EMV), password managers, radio link encryption, peripheral authentication, other secure operations, etc. [00106] Additionally, SM core 905 may be configured to receive one or more hardware ("HW") constants that may be used in the IC configuration process. HW constants may include for example, a product chip ID, one or more keys (such as an RSA or EC-DSA public key) for the root-authority system, one or more keys from a delegate-authority system, one or more base keys, one or more additional security keys, parameters for SM core 905 operation (e.g., memory usage, supported commands, etc.), error correction data, etc. A product chip ID can uniquely identify a particular SM-enabled IC, or a particular SM-enabled IC series, or both, with an identification value. The security keys may be symmetric or asymmetric (and, if asymmetric, public or private). In some embodiments, the one or more base keys may be derived from a master key, an identification code of the SM-enabled IC series, a chip-specific identifier, or some combination thereof. Error correction data can include, for example, checksums related to one or more of the security keys.

SM core 905 may be configured to generate interrupts to processor 955. For example, SM core 905 may be configured to generate an interrupt when the feature state of the SM-enabled IC has been updated, when ready to receive additional I/O, when a key has been output, etc.

SM core 905 may be configured to execute one or more built in self checks. For example, SM core 905 may be configured to perform a self-check when first powered up, under the control of the test interface, etc.

In some embodiments, system 900 is a single IC (such as a system-on-chip) that combines all of the components shown in FIG. 9, or most of the components (such as everything except processor 955 and host memory 970).

In some embodiments, all or some of system 900 may be constructed to resist tampering by outside sources. For example, SM core 905 may include a security mesh (not shown) or be fabricated under a security mesh. A security mesh is a wire network fabricated on top of the primary logic circuits, e.g. using one or more of the top metal layers on an integrated circuit. The security mesh may be paired with an active sensor network intended to detect damage to the wires comprising the mesh. In this embodiment, SM core 905 is configured to refuse to perform sensitive operations if the active sensor indicates that some of the security mesh wiring has been damaged. Additionally, SM core 905 may be configured to perform other countermeasures, such as erasing secure memory 910.

Figure 10:
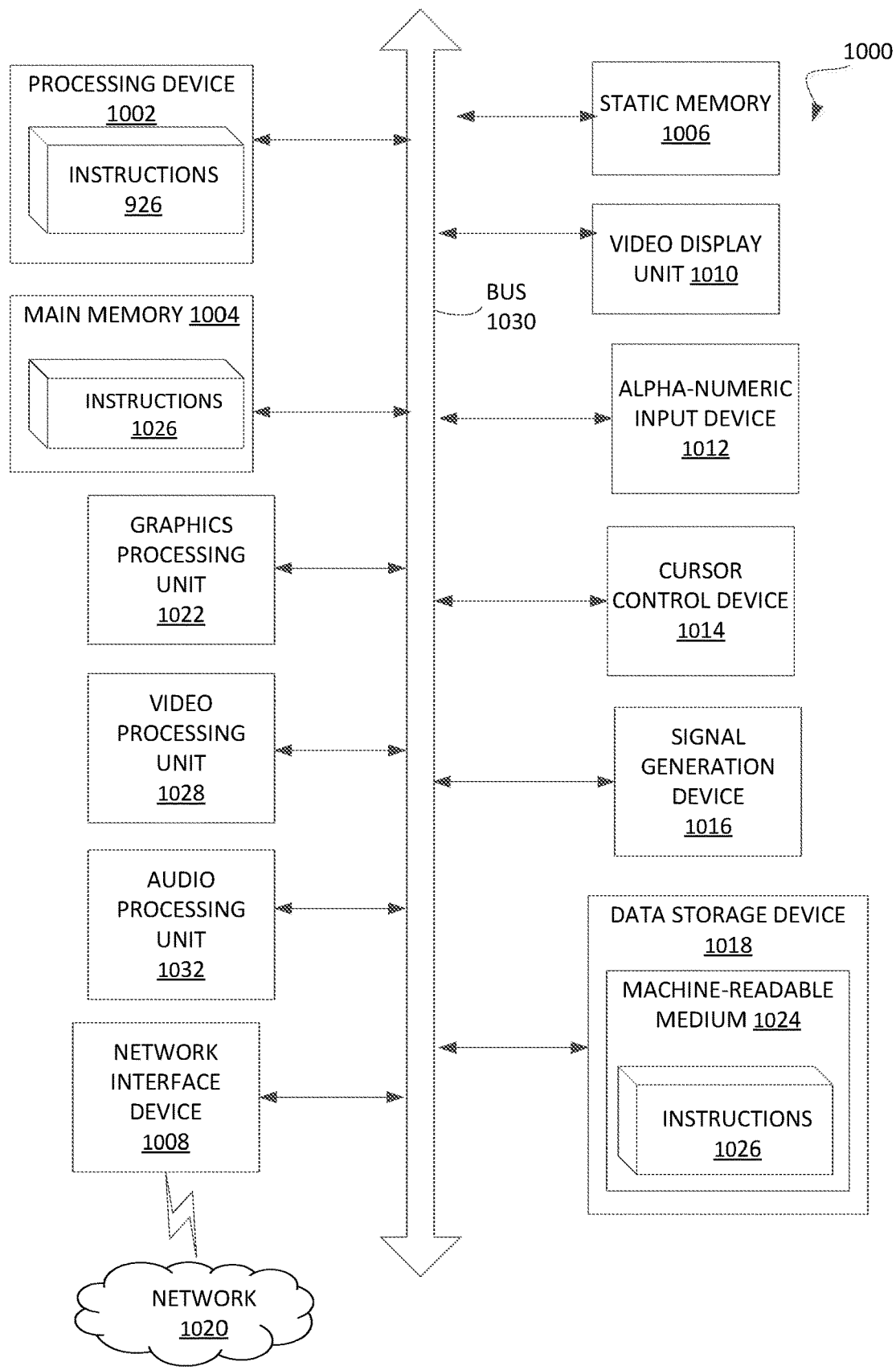
FIG. 10 illustrates a block diagram of an embodiment of a computer system in which some embodiments of the disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, and a signal generation device 1016 (e.g., a speaker).

The data storage device 1018 may include a machine-readable storage medium 1024 (also known as a computer-readable medium) on which is stored one or more sets of instructions or software 1026 embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In one implementation, the instructions 1026 include instructions to implement functionality corresponding to a security manager (e.g., security manager 160 of FIG. 1 or security manager 200 of FIG. 2). While the machine-readable storage medium 1028 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   identifying, by a processing device, information being stored in a memory that is associated with an integrated circuit and specifying one or more privileges assigned to a first entity and one or more privileges assigned to a root entity that has authority to manage or configure the integrated circuit during a manufacturing lifecycle of the integrated circuit;
   receiving, by the processing device, a request associated with the one or more privileges assigned to at least one of the root entity or the first entity, each of the one or more privileges corresponding to an operation of the integrated circuit, wherein the request comprises a revocation of the one or more privileges assigned to at least one of the root entity or the first entity; and
   programing, by the processing device, the memory to modify the information being stored in the memory that is associated with the integrated circuit in response to the request associated with the one or more privileges assigned to at least one of the root entity or the first entity.

2. The method of claim 1, wherein the first entity is a delegate entity, wherein the one or more privileges assigned to the first entity specify whether the first entity is allowed to delegate one or more privileges corresponding to the operation of the integrated circuit to another delegate entity.

3. The method of claim 1, wherein the first entity has been assigned the one or more privileges by the root entity, and wherein the revocation comprises a revocation of the one or more privileges assigned to the root entity only.

4. The method of claim 1, wherein the first entity has been assigned the one or more privileges by the root entity, and wherein the revocation comprises a revocation of the one or more privileges assigned to the first entity only.

5. The method of claim 1, further comprising:
   receiving a second request associated with one or more privileges to be assigned to a second entity, each of the one or more privileges to be assigned to the second entity corresponding to a second operation of the integrated circuit;
   identifying second information corresponding to the second entity, the second information being stored in the same memory that is associated with the integrated circuit and stores the information; and
   programming the memory to modify the second information corresponding to the second entity in response to the second request.

6. The method of claim 5, further comprising:
   receiving a third request associated with one or more privileges to be assigned to the second entity, wherein the second entity has been assigned the one or more privileges by the root entity, wherein the third request comprises a revocation of the one or more privileges assigned to the root entity; and
   programming the memory to modify the second information being stored in the memory that is associated with the integrated circuit in response to the third request associated with the one or more privileges assigned to the root entity.

7. The method of claim 1, further comprising:
   receiving a second request from the first entity to access a particular operation of the integrated circuit; and
   allowing access to the particular operation of the integrated circuit to the first entity when the information stored in the memory identifies that the first entity has been assigned a privilege to access the particular operation of the integrated circuit.

8. The method of claim 1, further comprising:
   receiving a request from a second entity to access a particular operation of the integrated circuit; and
   preventing access to the particular operation of the integrated circuit to the second entity when the information stored in the memory identifies that the second entity has not been assigned a privilege to access the particular operation of the integrated circuit.

9. The method of claim 1, further comprising:
   receiving a second request from the first entity to access a particular operation of the integrated circuit;

identifying information being stored in the memory that corresponds to a permission associated with the particular operation of the integrated circuit from each of a plurality of other entities; and allowing access for the first entity to the particular operation of the integrated circuit when the information being stored in the memory indicates that the particular operation of the integrated circuit is permitted to be performed by the first entity.

10. The method of claim 9, wherein the particular operation of the integrated circuit is a debug operation.

11. A system comprising:

a plurality of components in an integrated circuit to perform a plurality of operations;

a memory to store information associated with a plurality of privileges for a plurality of entities to have the plurality of components perform the plurality of operations at least during a manufacturing lifecycle of the integrated circuit; and a security manager in the integrated circuit, comprising a processor and operatively coupled with the memory, to:

identify information being stored in a memory that is associated with an integrated circuit and specifying one or more privileges assigned to a first entity and one or more privileges assigned to a root entity that has authority to manage or configure the integrated circuit during a manufacturing lifecycle of the integrated circuit;

receive a request associated with the one or more privileges assigned to at least one of the root entity or the first entity, each of the one or more privileges corresponding to an operation of the integrated circuit, wherein the request comprises a revocation of the one or more privileges assigned to at least one of the root entity or the first entity; and program the memory to modify the information being stored in the memory that is associated with the integrated circuit in response to the request associated with the one or more privileges assigned to at least one of the root entity or the first entity.

12. The system of claim 11, wherein the memory is a one-time programmable (OTP) memory.

13. The system of claim 11, wherein the first entity has been assigned the one or more privileges by the root entity, and wherein the revocation comprises a revocation of the one or more privileges assigned to the root entity only.

14. The system of claim 11, wherein the security manager is further to:

receive a request from the first entity to have one or more of the plurality of components perform a particular operation;

identify information being stored in the memory that corresponds to a permission associated with the particular operation from each of a plurality of other entities; and allow the one or more of the plurality of components to perform the particular operation when the information being stored in the memory that corresponds to the permission indicates that the particular operation is permitted to be performed by the one or more of the plurality of components in response to the request by the first entity.

15. The system of claim 14, wherein the particular operation of the integrated circuit is a debug operation.

16. A non-transitory computer readable medium including data that, when accessed by a processing device of an integrated circuit, cause the processing device to perform operations comprising:

identify information being stored in a memory that is associated with an integrated circuit and specifying one or more privileges assigned to a first entity and one or more privileges assigned to a root entity that has authority to manage or configure the integrated circuit during a manufacturing lifecycle of the integrated circuit;

receive a request associated with the one or more privileges assigned to at least one of the root entity or the first entity, each of the one or more privileges corresponding to an operation of the integrated circuit, wherein the request comprises a revocation of the one or more privileges assigned to at least one of the root entity or the first entity; and program the memory to modify the information being stored in the memory that is associated with the integrated circuit in response to the request associated with the one or more privileges assigned to at least one of the root entity or the first entity.

17. The non-transitory computer readable medium of claim 16, wherein the memory is a one-time programmable (OTP) memory.

18. The non-transitory computer readable medium of claim 16, wherein the first entity has been assigned the one or more privileges by the root entity, and wherein the revocation comprises a revocation of the one or more privileges assigned to the root entity only.

19. The non-transitory computer readable medium of claim 16, the operations further comprising:

receive a request from the first entity to have the integrated circuit perform a particular operation;

identify information being stored in the memory that corresponds to a permission associated with the particular operation from each of a plurality of other entities; and allow the integrated circuit to perform the particular operation when the information being stored in the memory that corresponds to the permission indicates that the particular operation is permitted to be performed by the integrated circuit in response to the request by the first entity.

20. The non-transitory computer readable medium of claim 19, wherein the particular operation of the integrated circuit is a debug operation.

* * * * *